(12) United States Patent
Shang et al.

(10) Patent No.: US 12,393,198 B2
(45) Date of Patent: Aug. 19, 2025

(54) AUTOMATED GUIDED VEHICLE, AND METHOD AND SYSTEM FOR CONTROLLING AUTOMATED GUIDED VEHICLE

(71) Applicant: BEIJING JINGDONG QIANSHI TECHNOLOGY CO., LTD., Beijing (CN)

(72) Inventors: Chunpeng Shang, Beijing (CN); Zhen Wang, Beijing (CN); Xueqian Xin, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 392 days.

(21) Appl. No.: 17/997,291

(22) PCT Filed: May 20, 2021

(86) PCT No.: PCT/CN2021/094931
§ 371 (c)(1),
(2) Date: Oct. 27, 2022

(87) PCT Pub. No.: WO2021/233386
PCT Pub. Date: Nov. 25, 2021

(65) Prior Publication Data
US 2023/0176586 A1 Jun. 8, 2023

(30) Foreign Application Priority Data
May 21, 2020 (CN) .......................... 202010436900.6

(51) Int. Cl.
*G05D 1/00* (2024.01)
(52) U.S. Cl.
CPC ......... *G05D 1/0276* (2013.01); *G05D 1/0214* (2013.01)

(58) Field of Classification Search
None
See application file for complete search history.

(56) References Cited

U.S. PATENT DOCUMENTS

| 2004/0117076 | A1 | 6/2004 | Horst |
| 2012/0323474 | A1* | 12/2012 | Breed ................. G08G 1/161 701/117 |

(Continued)

FOREIGN PATENT DOCUMENTS

| CN | 104977929 A | 10/2015 |
| CN | 105223951 A | 1/2016 |

(Continued)

OTHER PUBLICATIONS

"First Office Action and English language translation", CN Application No. 202010436900.6, Mar. 31, 2021, 16 pp.

(Continued)

*Primary Examiner* — Amelia Vorce
(74) *Attorney, Agent, or Firm* — Myers Bigel, P.A.

(57) ABSTRACT

Disclosed is an automated guided vehicle, which relates to the technical field of smart devices. The automated guided vehicle includes: a first receiver configured to receive a first signal of a first frequency that is sent by a first transmitter worn on a movable object or a fixed object; and a controller configured to control the running of the automated guided vehicle depending on whether the first receiver receives the first signal. The automated guided vehicle can determine, depending on whether the first receiver receives a signal, whether the automated guided vehicle is within a safe running range with respect to an object to be protected, so as to control the running of the automated guided vehicle.

15 Claims, 2 Drawing Sheets

(56) References Cited

U.S. PATENT DOCUMENTS

| | | | | |
|---|---|---|---|---|
| 2018/0148094 A1* | 5/2018 | Mukaiyama | ....... | B62D 15/0285 |
| 2019/0025839 A1 | 1/2019 | Manjunath et al. | | |
| 2019/0339711 A1 | 11/2019 | Kwak et al. | | |
| 2020/0200855 A1* | 6/2020 | Newman | ................ | G08G 1/163 |
| 2020/0398834 A1* | 12/2020 | Jewell | ................... | G01S 5/0231 |
| 2021/0021342 A1 | 1/2021 | Schäfer et al. | | |
| 2021/0294351 A1* | 9/2021 | Wiberg | ................ | G05D 1/0293 |
| 2021/0365035 A1* | 11/2021 | Verbrugh | ............. | G05D 1/0234 |
| 2021/0373575 A1* | 12/2021 | Manjunath | ............. | G05D 1/028 |
| 2022/0292973 A1* | 9/2022 | Orlando | ................ | B66F 9/0755 |

FOREIGN PATENT DOCUMENTS

| | | |
|---|---|---|
| CN | 110968090 A | 4/2020 |
| CN | 111762156 A | 10/2020 |
| JP | 2004005072 A | 1/2004 |
| WO | 2019179662 A1 | 9/2019 |

OTHER PUBLICATIONS

"International Search Report and Written Opinion of the International Searching Authority with English translation", International Application No. PCT/CN2021/094931, Aug. 24, 2021, 15 pp.

1 Notice of Reasons for Refusal and English language translation, JP Application No. 2022-570682, Mar. 18, 2025, 8 pp.

\* cited by examiner ved automated guided vehicle from the movable object or the fixed object; and a controller configured to control operation of the automated guided vehicle according to whether the first receiver receives the first signal.

AUTOMATED GUIDED VEHICLE, AND METHOD AND SYSTEM FOR CONTROLLING AUTOMATED GUIDED VEHICLE

CROSS-REFERENCE TO RELATED APPLICATIONS

This application is a U.S. National Stage Application under 35 U.S.C. § 371 of International Patent Application PCT/CN2021/094931, filed on May 20, 2021, which is based on and claims the priority of the Chinese patent application No. 202010436900.6 filed on May 21, 2020, the disclosures of both of which are hereby incorporated in their entireties into the present application.

TECHNICAL FIELD

This disclosure relates to the technical field of intelligent device, and particularly, to an automated guided vehicle and a method and system for controlling the automated guided vehicle.

BACKGROUND

Since an automated guided vehicle (AGV) is highly automated and intelligent, it is widely applied to various application scenarios such as warehousing, manufacturing, logistics, and hazardous working environments.

In a work area of the automated guided vehicle, there may be entry of workers or other devices. The automated guided vehicle may collide with these workers or other devices during its operation, resulting in casualties or device damage. Therefore, it becomes an urgent problem to prevent the automated guided vehicle from colliding with the people or other devices during its operation.

SUMMARY

According to some embodiments of the present disclosure, there is provided an automated guided vehicle, comprising: a first receiver configured to receive a first signal of a first frequency that is sent by a first transmitter equipped on a movable object or a fixed object; and a controller configured to control operation of the automated guided vehicle according to whether the first receiver receives the first signal.

In some embodiments, the controller is configured to: control the automated guided vehicle to stop or decelerate in the condition that the first receiver receives the first signal; or control the automated guided vehicle to operate normally in the condition that the first receiver does not receive the first signal.

In some embodiments, the controller is configured to: determine a distance between the first transmitter sending the first signal and the automated guided vehicle according to strength of the received first signal in the condition that the first receiver receives the first signal; determine an acceleration for the automated guided vehicle to decelerate according to the distance between the first transmitter sending the first signal and the automated guided vehicle; and control the automated guided vehicle to decelerate according to the acceleration.

In some embodiments, the automated guided vehicle further comprises: a second receiver configured to receive a second signal of a second frequency that is sent by a second transmitter equipped on the movable object or the fixed object, wherein the first frequency is less than the second frequency, wherein the first frequency is less than the second frequency; wherein the controller is further configured to control the operation of the automated guided vehicle according to whether the second receiver receives the second signal in the condition that the first receiver does not receive the first signal.

In some embodiments, the controller is configured to: control the automated guided vehicle to operate normally if the second receiver receives the second signal in the condition that the first receiver does not receive the first signal.

In some embodiments, the controller is configured to: control the automated guided vehicle to operate normally if the second receiver receives the second signal sent by the second transmitter or forwarded by another automated guided vehicle in the condition that the first receiver does not receive the first signal.

According to still other embodiments of the present disclosure, there is provided a method for controlling an automated guided vehicle, comprising: turning on a first receiver equipped on the automated guided vehicle, the first receiver being configured to receive a first signal of a first frequency that is sent by a first transmitter equipped on a movable object or fixed object; and controlling operation of the automated guided vehicle according to whether the first receiver receives the first signal.

In some embodiments, the controlling operation of the automated guided vehicle comprises: controlling the automated guided vehicle to stop or decelerate in the condition that the first receiver receives the first signal; or controlling the automated guided vehicle to operate normally in the condition that the first receiver does not receive the first signal.

In some embodiments, the controlling the automated guided vehicle to decelerate comprises: determining a distance between the first transmitter sending the first signal and the automated guided vehicle according to strength of the received first signal in the condition that the first receiver receives the first signal; determining an acceleration for the automated guided vehicle to decelerate according to the distance between the first transmitter sending the first signal and the automated guided vehicle; and controlling the automated guided vehicle to decelerate according to the acceleration.

In some embodiments, the method further comprises: turning on a second receiver equipped on the automated guided vehicle, the second receiver being configured to receive a second signal of a second frequency that is sent by a second transmitter equipped on the movable object or the fixed object, wherein the first frequency is less than the second frequency; wherein the controlling operation of the automated guided vehicle comprises: controlling the operation of the automated guided vehicle according to whether the second receiver receives the second signal in the condition that the first receiver does not receive the first signal.

In some embodiments, the controlling the operation of the automated guided vehicle comprises: controlling the automated guided vehicle to operate normally if the second receiver receives the second signal in the condition that the first receiver does not receive the first signal.

In some embodiments, the controlling the operation of the automated guided vehicle comprises: controlling the automated guided vehicle to operate normally if the second receiver receives the second signal sent by the second transmitter or forwarded by another automated guided vehicle in the condition that the first receiver does not receive the first signal.

According to further embodiments of the present disclosure, there is provided a non-transitory computer-readable storage medium stored a computer program which implements the method for controlling an automated guided vehicle according to any of the embodiments when executed by a processor.

According to still further embodiments of the present disclosure, there is provided a system for controlling an automated guided vehicle, comprising: a first transmitter equipped on a mobile object or a fixed object, configured to send a first signal of a first frequency; and one or more automated guided vehicles according to any of the embodiments.

In some embodiments, the system further comprises: a second transmitter equipped on the movable object or the fixed object, configured to send a second signal of a second frequency, wherein the first frequency is less than the second frequency.

BRIEF DESCRIPTION OF THE DRAWINGS

The accompanying drawings that need to be used in the description of the embodiments or related art will be briefly described below. The present disclosure will be more clearly understood from the following detailed description, which proceeds with reference to the accompanying drawings.

It is obvious that the drawings in the following description are merely some embodiments of this disclosure and that other drawings can also be derived by one of ordinary skill in the art without paying creative labor.

DETAILED DESCRIPTION

Technical solutions in the embodiments of the present disclosure will be clearly and completely described below in conjunction with the drawings in the embodiments of the present disclosure.

The embodiments of the present disclosure provide a solution of preventing an automated guided vehicle from colliding with objects such as people or devices during its operation.

In the embodiments of the present disclosure, the automated guided vehicle is equipped with a signal receiver, the movable object or fixed object to be protected is equipped with a signal transmitter, and the automated guided vehicle can judge whether the automated guided vehicle is in a safe operation range relative to the object to be protected according to whether the receiver receives a signal, so as to control the operation of the automated guided vehicle, thereby preventing the automated guided vehicle from colliding with the object to be protected, such as people or devices, during the operation.

Figure 1:
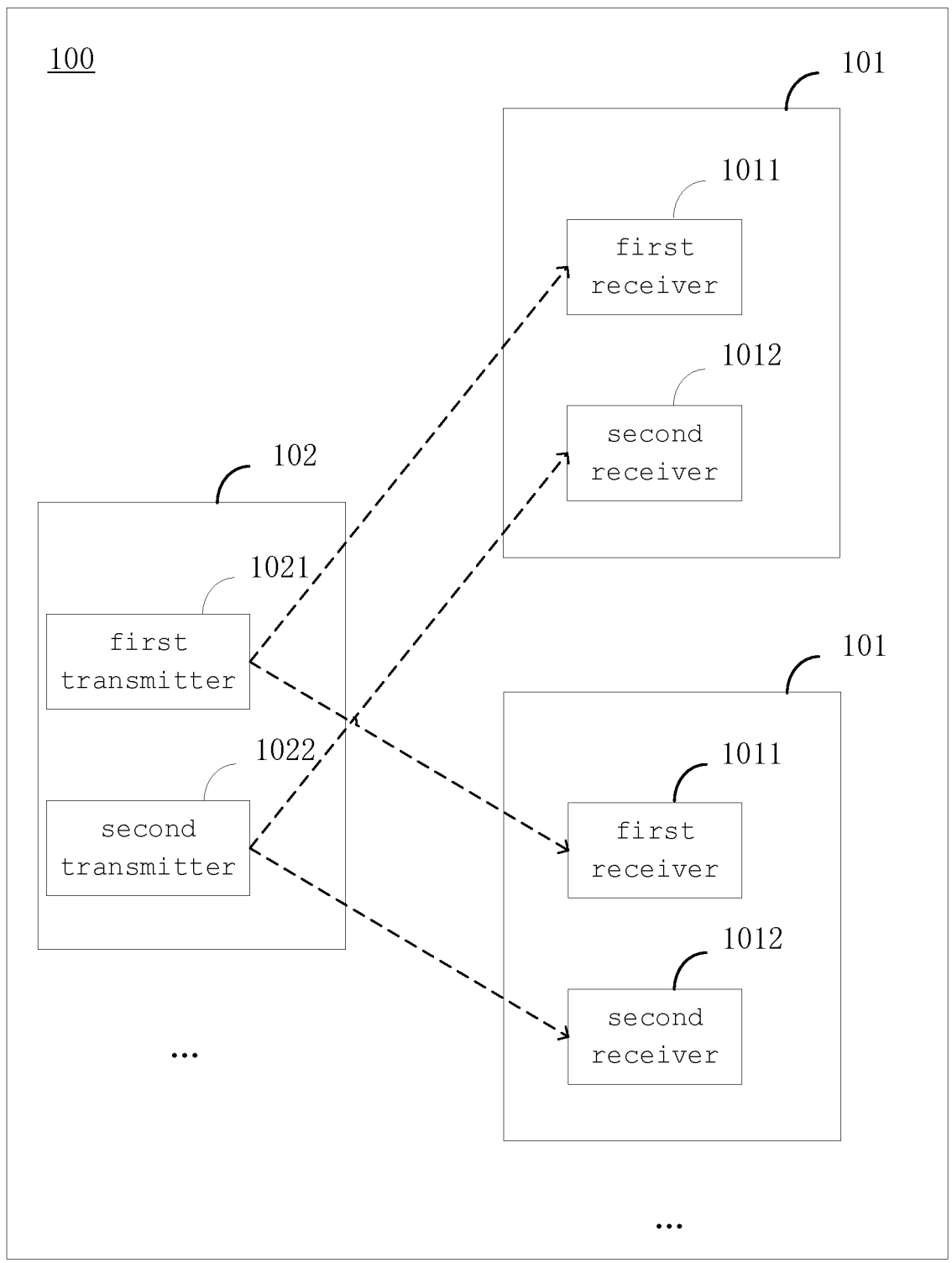
FIG. 1 illustrates a schematic diagram of a system for controlling an automated guided vehicle according to some embodiments of the present disclosure.

FIG. 1 illustrates a schematic diagram of a system for controlling an automated guided vehicle according to some embodiments of the present disclosure.

As shown in FIG. 1, the system 100 for controlling an automated guided vehicle of this embodiment comprises one or more automated guided vehicles 101 equipped with a signal receiver, and a signal transmitter equipped on an object 102 to be protected, such as a movable object or a fixed object. The signal transmitter comprises, for example, a first transmitter 1021. If the automated guided vehicle enters signal coverage of the first transmitter 1021, this shows that the automated guided vehicle is close to the object to be protected that is equipped with the first transmitter 1021 and is within a dangerous operation range. The signal transmitter further comprises, for example, a second transmitter 1022. If the automated guided vehicle has just entered signal coverage of the second transmitter 1022, this shows that the automated guided vehicle is far from the object to be protected that is equipped with the second transmitter 1022 and is currently within a safe operation range. A signal receiver r used in combination with the first transmitter 1021 is designated as a first receiver 1011. A signal receiver used in combination with the second transmitter 1022 is designated as a second receiver 1012.

The first transmitter 1021 can be, for example, a signal transmitter equipped on the object to be protected, such as the movable object or the fixed object, and the first transmitter 1021 is configured to send a first signal of a first frequency. For example, the first transmitter 1021 can be equipped on the movable object such as people or other movable devices, or can be equipped on the fixed object such as fixed facilities. The first signal is a periodic signal sent by the first transmitter 1021, and data content of the first signal is, for example, ID (Identity Document) identification information of the first transmitter. A sending antenna of the first transmitter can employ, for example, an omni-directional antenna, to make 360 degree protection to the object equipped with the first transmitter.

When the first frequency is set, a safe braking distance of the automated guided vehicle is considered, so that a transmission distance of the first signal is greater than or equal to the safe braking distance of the automated guided vehicle. In some embodiments, the first frequency is set such that the transmission distance of the first signal is slightly greater than the safety braking distance of the automated guided vehicle. Assuming that the safety braking distance of the automated guided vehicle is 5 meters, the first frequency for the transmission is set in such a way that the first signal can reach 5.2 meters, to reserve sufficient response time for the automated guided vehicle.

The automated guided vehicle 101 is configured to receive the first signal sent by the first transmitter 1021 through the first receiver 1011 and control operation of the automated guided vehicle according to whether the first receiver 1011 receives the first signal. For example, the automated guided vehicle 101 is configured to, in the condition that the first receiver 1011 receives the first signal, which shows that the automated guided vehicle 101 is close to the object to be protected that is equipped with the first transmitter 1021 and is in the dangerous operation range, control the automated guided vehicle 101 to stop or decelerate; and in the condition that the first receiver does not receive the first signal, which shows that the automated guided vehicle is far from the object to be protected that is equipped with the first transmitter 1021 and is currently in the safe operation range, control the automated guided vehicle 101 to operate normally.

In some embodiments, a method for controlling the automated guided vehicle 101 to decelerate comprises: in the condition that the first receiver receives the first signal, first, determining a distance between the first transmitter 1021 sending the first signal and the automated guided vehicle 101 according to strength of the received first signal; then, determining an acceleration for the automated guided vehicle 101 to decelerate according to the distance between the first transmitter 1021 sending the first signal and the automated guided vehicle 101; next, controlling the automated guided vehicle 101 to decelerate according to the determined acceleration.

The determining a distance between the first transmitter 1021 sending the first signal and the automated guided vehicle 101 according to strength of the received first signal comprises, for example: calculating the distance between the first transmitter 1021 (i.e. the movable object or fixed object equipped the first transmitter) and the automated guided vehicle 101 using a RSSI (Received Signal Strength Indication) method, which is, for example, denoted as S. For example, the acceleration for the automated guided vehicle to decelerate can be determined using the following equation:

$$a = V^2 / (2 \times (S - S1))$$

where a denotes the acceleration for the automated guided vehicle to decelerate (which can also be referred to as a minimum acceleration, that is, it is allowed that the automated guided vehicle decelerates at an acceleration greater than or equal to a), V is a current speed of the automated guided vehicle, S is a distance calculated according to the strength of the received first signal, and S1 denotes a preset safety constant for tolerance error, for example, set S1=0.5 m.

In some embodiments, for example, by setting that a certain distance interval corresponds to one determined acceleration value, the automated guided vehicle can decelerate at the acceleration, and until a certain distance is reached, the automated guided vehicle can be controlled to stop. For example, when the distance between the automated guided vehicle and the object to be protected belongs to a distance interval [8,15), an acceleration value for the automated guided vehicle to decelerate corresponding to the distance interval is set as a=5 m/s$^2$; when the distance between the automated guided vehicle and the object to be protected is in a distance interval [2,8), an acceleration value for the automated guided vehicle to decelerate corresponding to the distance interval is set as a=10 m/s$^2$; and when the distance between the automated guided vehicle and the object to be protected is in a distance interval [0,2), the automated guided vehicle is controlled to stop. When the distance between the automated guided vehicle and the object to be protected is greater than or equal to 15, an acceleration value for the automated guided vehicle to decelerate corresponding to the distance interval is set as a=0 m/s$^2$, that is, the automated guided vehicle is controlled to operate normally at a constant speed.

The second transmitter 1022 can be, for example, a second transmitter equipped on the movable object or the fixed object, and the second transmitter 1022 is configured to send a second signal of a second frequency. The second signal is a periodic signal sent by the second transmitter 1022, and data content of the second signal is, for example, ID (Identity Document) identification information of the second transmitter. For example, the second transmitter 1022 can be equipped on the movable object such as people or other movable devices, or can be equipped on the fixed object such as fixed facilities.

The first frequency is less than the second frequency, that is, the second signal uses a higher frequency than the first signal, and thus a transmission distance of the second signal can be farther. In the system for controlling an automated guided vehicle, the transmission distance of the first signal is related to a set danger distance, and if the automated guided vehicle receives the first signal, this shows that the distance between the object to be protected and the automated guided vehicle is dangerous, and the automated guided vehicle needs to be controlled to decelerate or stop. The transmission distance of the second signal is related to a set safety distance, if the automated guided vehicle receives the second signal, this shows that the distance between the object to be protected and the automated guided vehicle is safe, and the automated guided vehicle can be controlled to operate normally. The first signal (with short transmission distance) is used for detecting the danger distance for the operation of the automated guided vehicle, the second signal (with long transmission distance) is used for detecting the safety distance for the operation of the automated guided vehicle, and by using the first signal and the second signal in combination, the reliability of the whole system for safety control of the automated guided vehicle can be improved, to prevent the automated guided vehicle from colliding with the object to be protected, such as people or devices.

The automated guided vehicle 101 receives the second signal of the second frequency that is sent by the second transmitter 1022 through the second receiver 1012. In the condition that the first receiver 1011 does not receive the first signal, the operation of the automated guided vehicle 101 is controlled according to whether the second receiver 1012 receives the second signal. For example, in the condition that the first receiver 1011 does not receive the first signal, if the second receiver 1012 receives the second signal, this shows that the automated guided vehicle is far from the object to be protected that is equipped with the second transmitter 1022 and is currently in the safe operation range, and the automated guided vehicle 101 can be controlled to operate normally.

That the second receiver 1012 receives the second signal comprises: the second receiver 1012 receiving the second signal directly sent by the second transmitter 1022. When the distance between the automated guided vehicle 101 and the object 102 to be protected that is equipped with the second transmitter 1022 exceeds a maximum distance that can be sent by the second signal, the second receiver 1012 of the automated guided vehicle 101 can also determine that the automated guided vehicle is in the safe operation range by receiving a second signal forwarded by another automated guided vehicle 101, and if the automated guided vehicle 101 can receive the second signal forwarded by another automated guided vehicle 101, this shows that the automated guided vehicle 101 is far from the object to be protected that is equipped with the second transmitter 1022 and is currently in the safe operation range, and the automated guided vehicle 101 can be controlled to operate normally. The automated guided vehicle can not only receive the second signal directly sent by the second transmitter, but also receive the second signal forwarded by other automated guided vehicles, so that the second signal can cover as many automated guided vehicles as possible. If the automated guided vehicle receives the second signal, this shows that the automated guided vehicle is far from the object to be protected that is equipped with the second transmitter and is currently in the safe operation range and the automated guided vehicle can be controlled to operate normally, thereby ensuring that the automated guided vehicle is prevented from colliding with the object to be protected, such as people or devices.

In some embodiments, each object to be protected can be equipped with a plurality of first transmitters, or, a plurality of second transmitters. Within a certain distance range, any transmitter (the first transmitter or the second transmitter) on each movable object or fixed object can independently transmit a signal to any receiver (the first receiver or the second receiver) on any automated guided vehicle, and a receiver on each automated guided vehicle can receive a signal sent by any transmitter equipped on the movable object or fixed object, which improves the reliability of the whole system with respect to safety control of the automated guided vehicle.

In some embodiments, on the first transmitter, a detection circuit is added, an output port of which is connected to an enable port of the second transmitter. That is, if the first transmitter is unable to transmit the first signal, the second signal is also unable to be sent. This avoids a situation that the automated guided vehicle is controlled to operate normally due to misjudgment of the automated guided vehicle that is caused by a failure of the first transmitter, that is, this avoids the automated guided vehicle from colliding with other objects, and ensures the safe operation of the automated guided vehicle.

Figure 2:
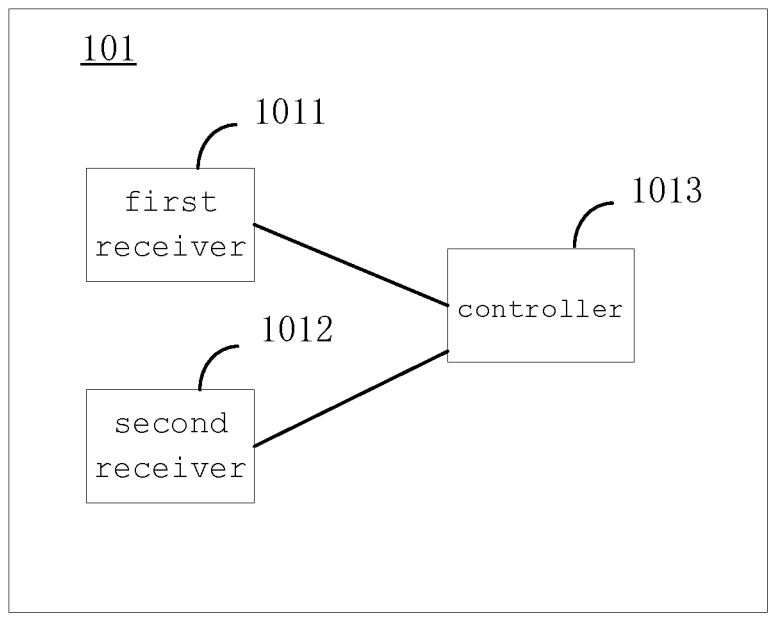
FIG. 2 illustrates a schematic diagram of an automated guided vehicle according to some embodiments of the present disclosure.

FIG. 2 illustrates a schematic diagram of an automated guided vehicle according to some embodiments of the present disclosure. The automated guided vehicles 101 of some exemplary embodiments will be described below in conjunction with FIG. 2.

As shown in FIG. 2, the automated guided vehicle 101 of this embodiment comprises a signal receiver. The signal receiver comprises, for example, a first receiver 1011, and a controller 1013, and can also comprise a second receiver 1012, wherein the two receivers can receive signals of different frequencies (or, different transmission distances). The first receiver 1011 can be set to be one or more, or the second receiver 1012 can be set to be one or more. Within a certain distance range, any first receiver 1011 can receive a signal sent by a first transmitter, any second receiver 1012 can receive a signal sent by a second transmitter, and providing more than one signal receivers improves the reliability of the whole system with respect to safety control of the automated guided vehicle.

The first receiver 1011 is configured to receive a first signal of a first frequency that is sent by the first transmitter (for example, the first transmitter 1021 shown in FIG. 1) equipped on a movable object or a fixed object. The controller 1013 is configured to control operation of the automated guided vehicle 101 according to whether the first receiver 1011 receives the first signal.

In some embodiments, the controller 1013 is configured to: in the condition that the first receiver 1011 receives the first signal, control the automated guided vehicle 101 to stop or decelerate; and in the condition that the first receiver 1011 does not receive the first signal, control the automated guided vehicle 101 to operate normally.

The controlling the automated guided vehicle 101 to decelerate comprises: in the condition that the first receiver 1011 receives the first signal, first, determining a distance between the first transmitter sending the first signal and the automated guided vehicle 101 according to strength of the received first signal, for example, referring to the aforementioned method for determining the distance between the first transmitter and the automated guided vehicle; then, determining an acceleration for the automated guided vehicle 101 to decelerate according to the distance between the first transmitter sending the first signal and the automated guided vehicle 101, for example, referring to the aforementioned method for determining the acceleration for the automated guided vehicle to decelerate; next, controlling the automated guided vehicle 101 to decelerate according to the acceleration.

In some embodiments, the second receiver 1012 is configured to receive a second signal of a second frequency that is sent by the second transmitter (for example, the second transmitter 1022 shown in FIG. 1) equipped on the mobile object or the fixed object, wherein the first frequency is less than the second frequency. The first signal (with short transmission distance) is used for detecting a danger distance for the operation of the automated guided vehicle, the second signal (with long transmission distance) is used for detecting a safety distance for the operation of the automated guided vehicle, and by using the first signal and the second signal in combination, the reliability of the whole system with respect to safety control of the automated guided vehicle can be improved, which ensures that the automated guided vehicle is prevented from colliding with the object to be protected, such as people or devices.

In some embodiments, after a second receiver 1012 of any automated guided vehicle 101 receives the second signal sent by the second transmitter 1022, the automated guided vehicle 101 can forward the second signal received by its own second receiver 1012 to other automated guided vehicles, for example, by means of broadcasting.

At this time, the controller 1013 is configured to: in the condition that the first receiver 1011 does not receive the first signal, control the operation of the automated guided vehicle 101 according to whether the second receiver 1012 receives the second signal. In some embodiments, the controller 1013 is configured to: in the condition that the first receiver 1011 does not receive the first signal, if the second receiver 1012 receives the second signal, control the automated guided vehicle 101 to operate normally. That the second receiver 1012 receives the second signal comprises: in the condition that the first receiver 1011 does not receive the first signal, the second receiver 1012 receiving the second signal sent by the second transmitter, or the second receiver 1012 receiving a second signal forwarded by another automated guided vehicle 101.

Figure 3:
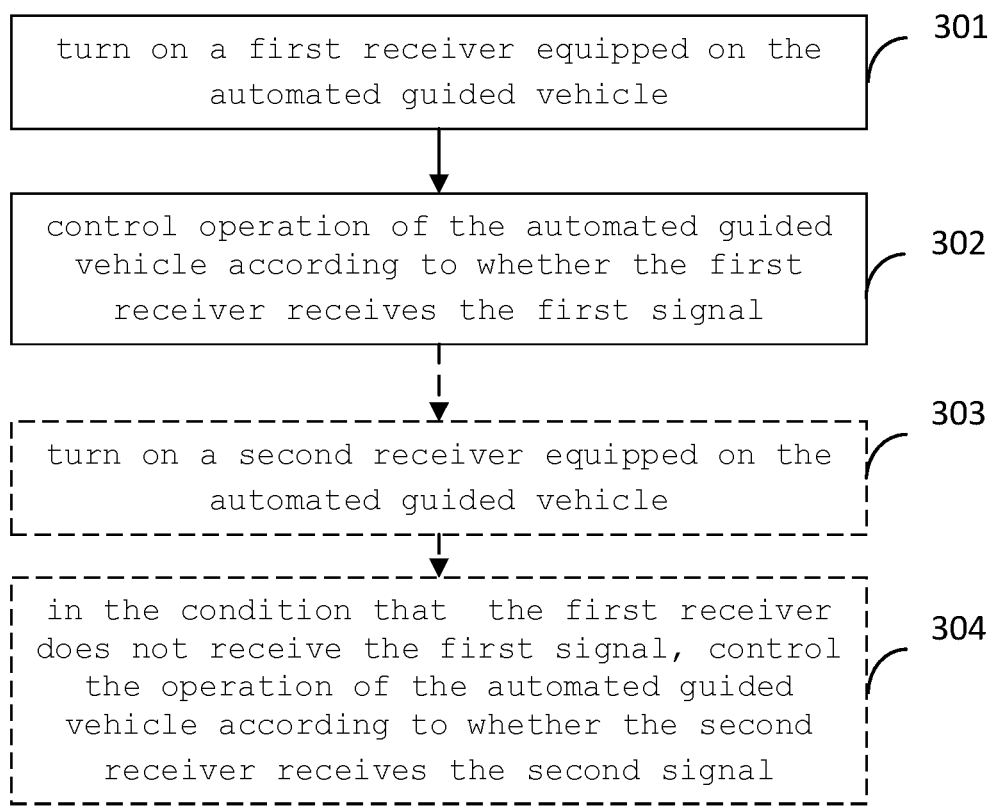
FIG. 3 illustrates a flow diagram of a method for controlling an automated guided vehicle according to some embodiments of the present disclosure.

FIG. 3 illustrates a flow diagram of a method for controlling an automated guided vehicle according to some embodiments of the present disclosure.

As shown in FIG. 3, the method for this embodiment comprises steps 301 to 304.

In step 301, a first receiver equipped on the automated guided vehicle is turned on, the first receiver being configured to receive a first signal of a first frequency that is sent by a first transmitter equipped on a movable object or a fixed object.

For example, a first receiver equipped on each automated guided vehicle can be turned on by controlling console commands of all automated guided vehicles by workers. The first receiver can be multiple, so that any first receiver on each automated guided vehicle can receive the first signal sent by the first transmitter, which improves the reliability of the whole system with respect to safety control of the automated guided vehicles and ensures the reliability of the whole system.

In step 302, operation of the automated guided vehicle is controlled according to whether the first receiver receives the first signal.

The controlling operation of the automated guided vehicle comprises: in the condition that the first receiver receives the first signal, controlling the automated guided vehicle to stop or decelerate; and in the condition that the first receiver does not receive the first signal, controlling the automated guided vehicle to operate normally.

The controlling the automated guided vehicle to decelerate comprises: in the condition that the first receiver receives the first signal, first, determining a distance between the first transmitter sending the first signal and the automated guided vehicle according to strength of the received first signal, for example, referring to the aforementioned method for determining the distance between the first transmitter and the automated guided vehicle; then, determining an acceleration for the automated guided vehicle to decelerate according to the distance between the first transmitter sending the first signal and the automated guided vehicle, for example, referring to the aforementioned method for determining the acceleration for the automated guided vehicle to decelerate; next, controlling the automated guided vehicle to decelerate according to the acceleration.

In some embodiments, if a second receiver is equipped on the automated guided vehicle, the method further comprises steps 303 and 304.

The second receiver can be multiple, so that any second receiver on each automated guided vehicle can receive the second signal sent by the second transmitter, which improves the reliability of the whole system with respect to safety control of the automated guided vehicle and ensures the reliability of the whole system.

In step 303, the second receiver equipped on the automated guided vehicle is turned on. The second receiver is configured to receive a second signal of a second frequency that is sent by a second transmitter equipped on the movable object or the fixed object, wherein the first frequency is less than the second frequency.

In step 304, in the condition that the first receiver does not receive the first signal, the operation of the automated guided vehicle is controlled according to whether the second receiver receives the second signal.

The controlling the operation of the automated guided vehicle comprises: in the condition that the first receiver does not receive the first signal, if the second receiver receives the second signal, controlling the automated guided vehicle to operate normally. That the second receiver receives the second signal comprises: the second receiver receiving the second signal sent by the second transmitter, or the second receiver receiving a second signal forwarded by another automated guided vehicle.

In the above embodiment, the automated guided vehicle comprises the first receiver, the operation of the automated guided vehicle can be controlled according to the first signal received by the first receiver, the transmission distance of the first signal is related to the set danger distance, if the automated guided vehicle receives the first signal, this shows that the distance between the object to be protected and the automated guided vehicle is dangerous and the automated guided vehicle needs to be controlled to decelerate or stop, so that the automated guided vehicle can travel safely, and by means of one group of signal receiver and signal transmitter, the safe travelling can be realized with a relatively low cost. Or the automated guided vehicle comprises the first receiver and the second receiver, the operation of the automated guided vehicle is controlled according to the first signal and the second signal respectively received by the first receiver and the second receiver, the first signal (with short transmission distance) is used for detecting the dangerous distance for the operation of the automated guided vehicle, the second signal (with long transmission distance) is used for detecting the safe distance of the operation of the automated guided vehicle, and by using the first signal and the second signal in combination, the reliability of the whole system with respect to safety control of the automated guided vehicle can be improved, which ensures that the automated guided vehicle is prevented from colliding with the object to be protected, such as people or devices. In addition, the first receiver equipped on the automated guided vehicle can be multiple, or the second receiver equipped on the automated guided vehicle can also be multiple, so that any first receiver or any second receiver on each automated guided vehicle can receive a signal sent by a corresponding first transmitter or second transmitter, which improves the reliability of the whole system with respect to safety control of the automated guided vehicle.

It should be appreciated by those skilled in the art that, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-non-transitory readable storage media (including, but not limited to, disk memories, CD-ROMS, optical memories, etc.) having computer program code embodied therein.

The present disclosure is described with reference to flow diagrams and/or block diagrams of the method, device (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing the function specified in one or more flows in the flow diagrams and/or in one or more blocks in the block diagrams.

These computer program instructions can also be stored in a computer-readable memory that can guide the computer or other programmable data processing devices to work in a specific manner, such that the instructions stored in the computer-readable memory produce an article of manufacture including instruction means which implement the functions specified in one or more flows in the flow diagrams and/or in one or more blocks in the block diagrams.

These computer program instructions can also be loaded onto the computer or other programmable data processing devices, such that a series of operation steps are performed on the computer or other programmable devices to produce a computer-implemented process, and thus the instructions executed on the computer or other programmable devices provide steps for implementing the functions specified in one or more flows in the flow diagrams and/or in one or more blocks in the block diagrams.

The above description is merely the preferred embodiments of the present disclosure and is not used for limiting the present disclosure, and any modification, equivalent, improvement and the like, which is made within the spirit and scope of the present disclosure, should be contained in the protection scope of the present disclosure.

What is claimed is:

1. An automated guided vehicle, comprising:
    a first receiver configured to receive a first signal of a first frequency that is sent by a first transmitter equipped on a movable object or a fixed object;
    a second receiver configured to receive a second signal of a second frequency that is sent by a second transmitter equipped on the movable object or the fixed object, wherein the second signal travels farther than the first signal; and
    a controller configured to control operation of the automated guided vehicle according to whether the first receiver receives the first signal, to prevent the automated guided vehicle from colliding with the movable object or the fixed object equipped with the first transmitter, and control the operation of the automated guided vehicle according to whether the second receiver receives the second signal in the condition that the first receiver does not receive the first signal.

2. The automated guided vehicle according to claim 1, wherein the controller is configured to:
    control the automated guided vehicle to stop or decelerate in the condition that the first receiver receives the first signal; or
    control the automated guided vehicle to operate normally in the condition that the first receiver does not receive the first signal.

3. The automated guided vehicle according to claim 2, wherein the controller is configured to:
    determine a distance between the first transmitter sending the first signal and the automated guided vehicle according to strength of the received first signal in the condition that the first receiver receives the first signal;
    determine an acceleration for the automated guided vehicle to decelerate according to the distance between the first transmitter sending the first signal and the automated guided vehicle; and
    control the automated guided vehicle to decelerate according to the acceleration.

4. The automated guided vehicle according to claim 1, wherein the controller is configured to:
    control the automated guided vehicle to operate normally if the second receiver receives the second signal in the condition that the first receiver does not receive the first signal.

5. The automated guided vehicle according to claim 4, wherein the controller is configured to:
    control the automated guided vehicle to operate normally if the second receiver receives the second signal sent by the second transmitter or forwarded by another automated guided vehicle in the condition that the first receiver does not receive the first signal.

6. A system for controlling an automated guided vehicle, comprising:
    a first transmitter equipped on a mobile object or a fixed object, configured to send a first signal of a first frequency;
    a second transmitter equipped on the movable object or the fixed object, configured to send a second signal of a second frequency, wherein the second signal travels farther than the first signal; and
    one or more automated guided vehicles according to claim 1.

7. A method for controlling an automated guided vehicle, comprising:
    turning on a first receiver equipped on the automated guided vehicle, the first receiver being configured to receive a first signal of a first frequency that is sent by a first transmitter equipped on a movable object or fixed object;
    turning on a second receiver equipped on the automated guided vehicle, the second receiver being configured to receive a second signal of a second frequency that is sent by a second transmitter equipped on the movable object or the fixed object, wherein the second signal travels farther than the first signal; and
    controlling operation of the automated guided vehicle according to whether the first receiver receives the first signal, to prevent the automated guided vehicle from colliding with the movable object or the fixed object equipped with the first transmitter, wherein the controlling operation of the automated guided vehicle comprises: controlling the operation of the automated guided vehicle according to whether the second receiver receives the second signal in the condition that the first receiver does not receive the first signal.

8. The method for controlling an automated guided vehicle according to claim 7, wherein the controlling operation of the automated guided vehicle comprises:
    controlling the automated guided vehicle to stop or decelerate in the condition that the first receiver receives the first signal; or
    controlling the automated guided vehicle to operate normally in the condition that the first receiver does not receive the first signal.

9. The method for controlling an automated guided vehicle according to claim 8, wherein the controlling the automated guided vehicle to decelerate comprises:
    determining a distance between the first transmitter sending the first signal and the automated guided vehicle according to strength of the received first signal in the condition that the first receiver receives the first signal;
    determining an acceleration for the automated guided vehicle to decelerate according to the distance between the first transmitter sending the first signal and the automated guided vehicle; and
    controlling the automated guided vehicle to decelerate according to the acceleration.

10. The method for controlling an automated guided vehicle according to claim 7, wherein the controlling the operation of the automated guided vehicle comprises:
    controlling the automated guided vehicle to operate normally if the second receiver receives the second signal in the condition that the first receiver does not receive the first signal.

11. The method for controlling an automated guided vehicle according to claim 10, wherein the controlling the operation of the automated guided vehicle comprises:
    controlling the automated guided vehicle to operate normally if the second receiver receives the second signal sent by the second transmitter or forwarded by another automated guided vehicle in the condition that the first receiver does not receive the first signal.

12. A non-transitory computer-readable storage medium stored a computer program which implements the method for controlling an automated guided vehicle according to claim 7 when executed by a processor.

13. The storage medium according to claim 12, wherein the computer program implements
    controlling the automated guided vehicle to stop or decelerate in the condition that the first receiver receives the first signal; or controlling the automated guided vehicle to operate normally in the condition that the first receiver does not receive the first signal.

14. The storage medium according to claim 13, wherein the computer program implements
    determining a distance between the first transmitter sending the first signal and the automated guided vehicle according to strength of the received first signal in the condition that the first receiver receives the first signal;
    determining an acceleration for the automated guided vehicle to decelerate according to the distance between the first transmitter sending the first signal and the automated guided vehicle; and
    controlling the automated guided vehicle to decelerate according to the acceleration.

15. The storage medium according to claim 12, wherein the computer program implements controlling the automated guided vehicle to operate normally if the second receiver receives the second signal in the condition that the first receiver does not receive the first signal.

* * * * *